United States Patent

[11] 3,620,380

| [72] | Inventor | Daniel J. Borodin<br>Detroit, Mich. |
|---|---|---|
| [21] | Appl. No. | 854,862 |
| [22] | Filed | Sept. 3, 1969 |
| [45] | Patented | Nov. 16, 1971 |
| [73] | Assignee | U.S. Automation Company<br>Warren, Mich. |

[54] TRANSFER DEVICE
27 Claims, 12 Drawing Figs.

[52] U.S. Cl. .................................................... 214/1 BB,
214/146.5
[51] Int. Cl. .................................................. B66c 23/08
[50] Field of Search .......................................... 214/1 BZ, 1
B, 146.5

[56] References Cited
UNITED STATES PATENTS
Re. 25,889  10/1965  Willsea ........................  214/1 B3
3,051,328  8/1962  Brown ..........................  214/1 B3

Primary Examiner—Gerald M. Forlenza
Assistant Examiner—George F. Abraham
Attorney—Barnes, Kisselle, Raisch & Choate ABSTRACT: A device for transferring workpieces from one support to another, such as between a pair of conveyors. The device includes a track supported carriage on which a workpiece support arm is mounted for pivotal movement in a vertical plane. A pair of rotary cams are operatively connected, one between the carriage and the base on which it is supported and the other between the carriage and the support arm. One cam controls the translatory movement of the carriage on the base and the other controls the pivotal movement of the support arm so that by correlating the movement of the two cams any desired path of travel for the work-engaging portion of the support arm may be generated. The translatory movement of the carriage is also supplemented by a hydraulic cylinder operable in conjunction with the two rotary cams.

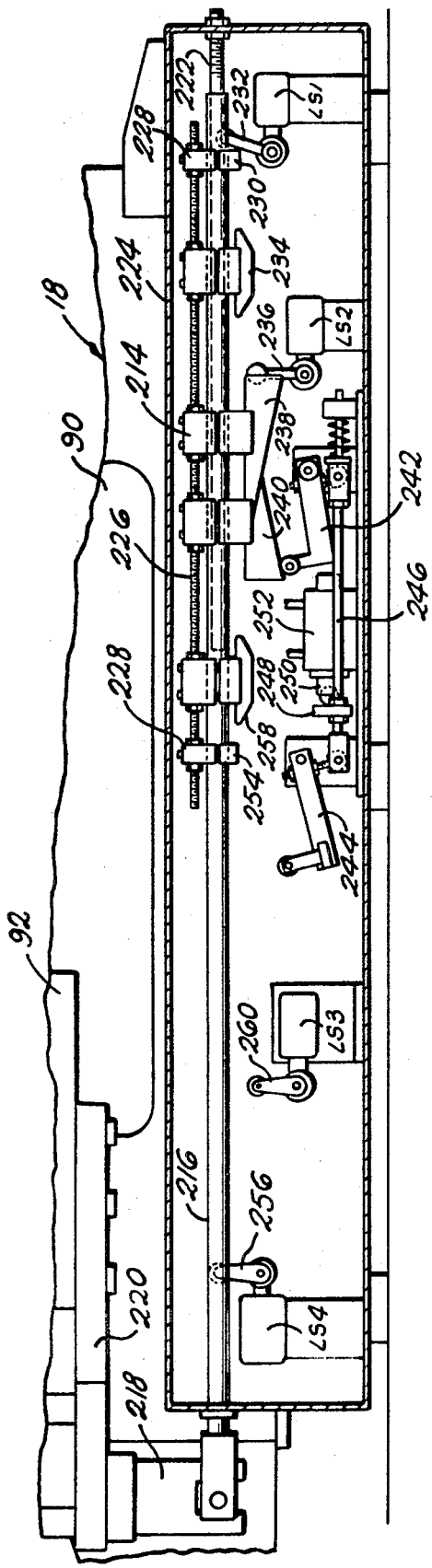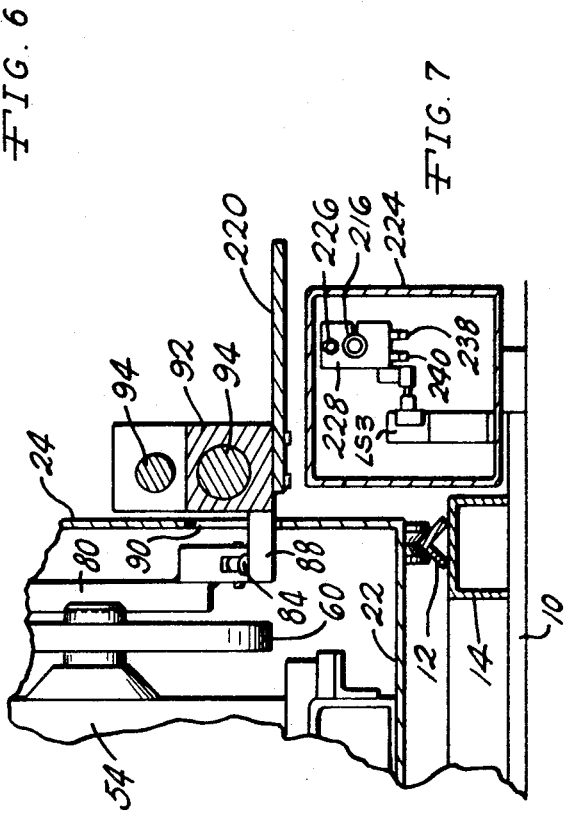

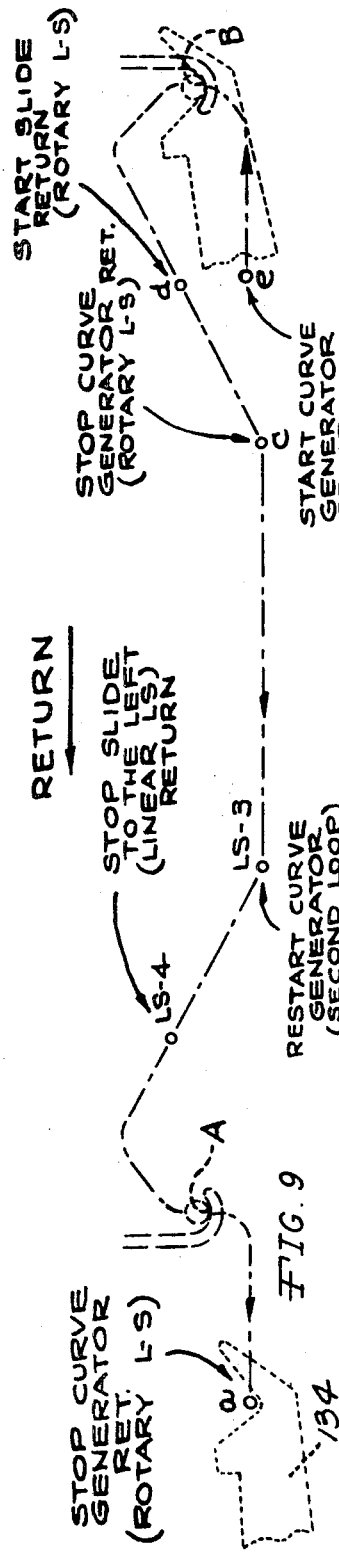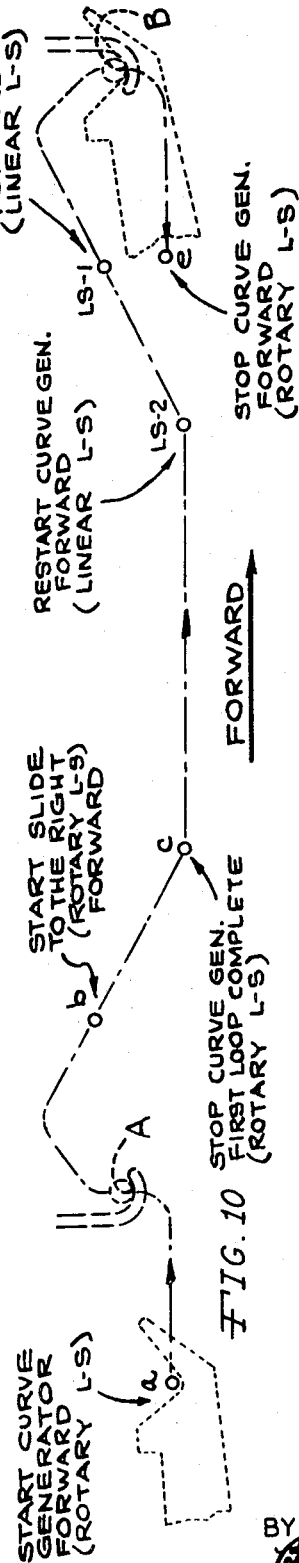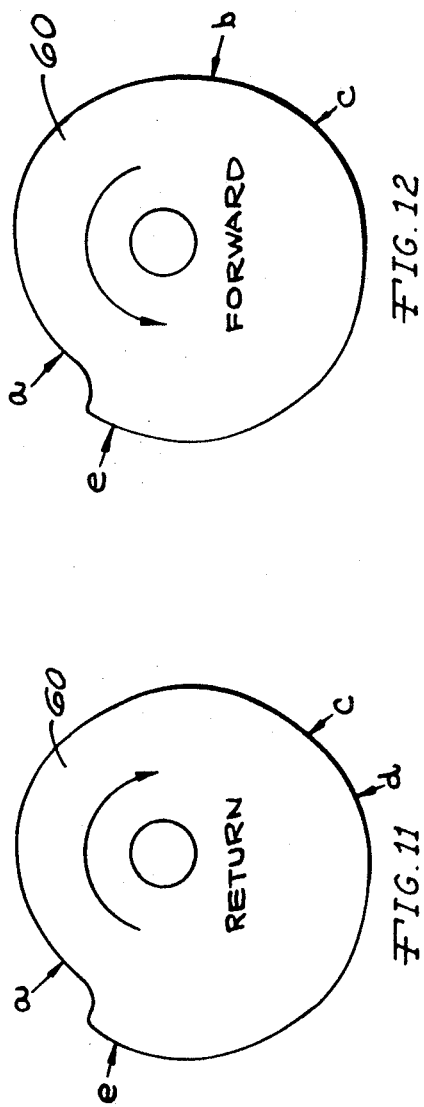

TRANSFER DEVICE

This invention relates to a transfer device and more particularly to a device for bodily transporting a workpiece from one accurately located position to another accurately located position.

In many manufacturing operations workpieces, electroplating racks for example, are transported by conveyors and it frequently becomes necessary to transfer the workpieces from a designated station of one conveyor to a designated station of an adjacent conveyor. The transfer of such workpieces normally involves the step of lifting the workpiece off one conveyor, transporting it laterally to adjacent the second conveyor and finally depositing the workpiece on the second conveyor. The transfer device of the present invention is designed to accomplish these steps automatically.

It is a primary object of the present invention to provide a transfer device of the type described which is designed so that the path of travel of the workpiece as it is transported from one position to another can conform to any predetermined trajectory.

A further object of the present invention resides in the provision of a transfer device of the type disclosed wherein the path of travel of the transported workpiece is generated primarily by two rotary cams.

A still further object of the invention resides in the provision of a transfer device of the type described which is of economical construction and design and which at the same time can be modified in a simple manner to obtain any desired path of travel of the workpiece and the workpiece support member of the transfer device.

Other features and objects of the invention will become apparent from the accompanying drawings and description, in which:

FIG. 6 is a fragmentary side elevational view of the limit switch assembly of the transfer device.

FIG. 7 is a sectional view along the line VII—VII in FIG. 2.

FIG. 8 is a sectional view along the line VIII—VIII in FIG. 2.

FIGS. 9 and 10 are diagrammatic views showing the path of travel of the work-engaging portion of the support arm on the return and forward strokes, respectively, of the carriage.

FIGS. 11 and 12 are views of the horizontal control cam and showing the control points thereon in the return and forward strokes, respectively, of the carriage.

The transfer device of the present invention generally comprises a base on which a carriage is mounted to reciprocate in a horizontal path. A work support arm assembly is mounted on the carriage for pivotal movement in a vertical plane. The work support arm assembly includes means for suspending and for clamping a workpiece (such as a plating rack or the like) in a stable position as the carriage is actuated through its forward and return strokes. Within the carriage there is arranged a hydraulically powered curve generator. The curve generator includes a pair of rotary cams, one of the cams being designed to actuate the carriage through its forward and return strokes and the other cam being designed to rock the work support arm assembly vertically. By correlating the translatory movement of the carriage with the rocking movement of the work support assembly a desired trajectory or path of travel of the work being transported can be generated. In addition, a hydraulic cylinder is interconnected between the carriage and base for supplementing the action of the rotary cam which controls the reciprocating movement of the carriage. The operation of the curve generator and the hydraulic cylinder are correlated by a series of rotary switches and a series of linear switches so as to produce the desired path of travel of the supported workpiece.

CARRIAGE AND BASE ASSEMBLY

Figure 1:
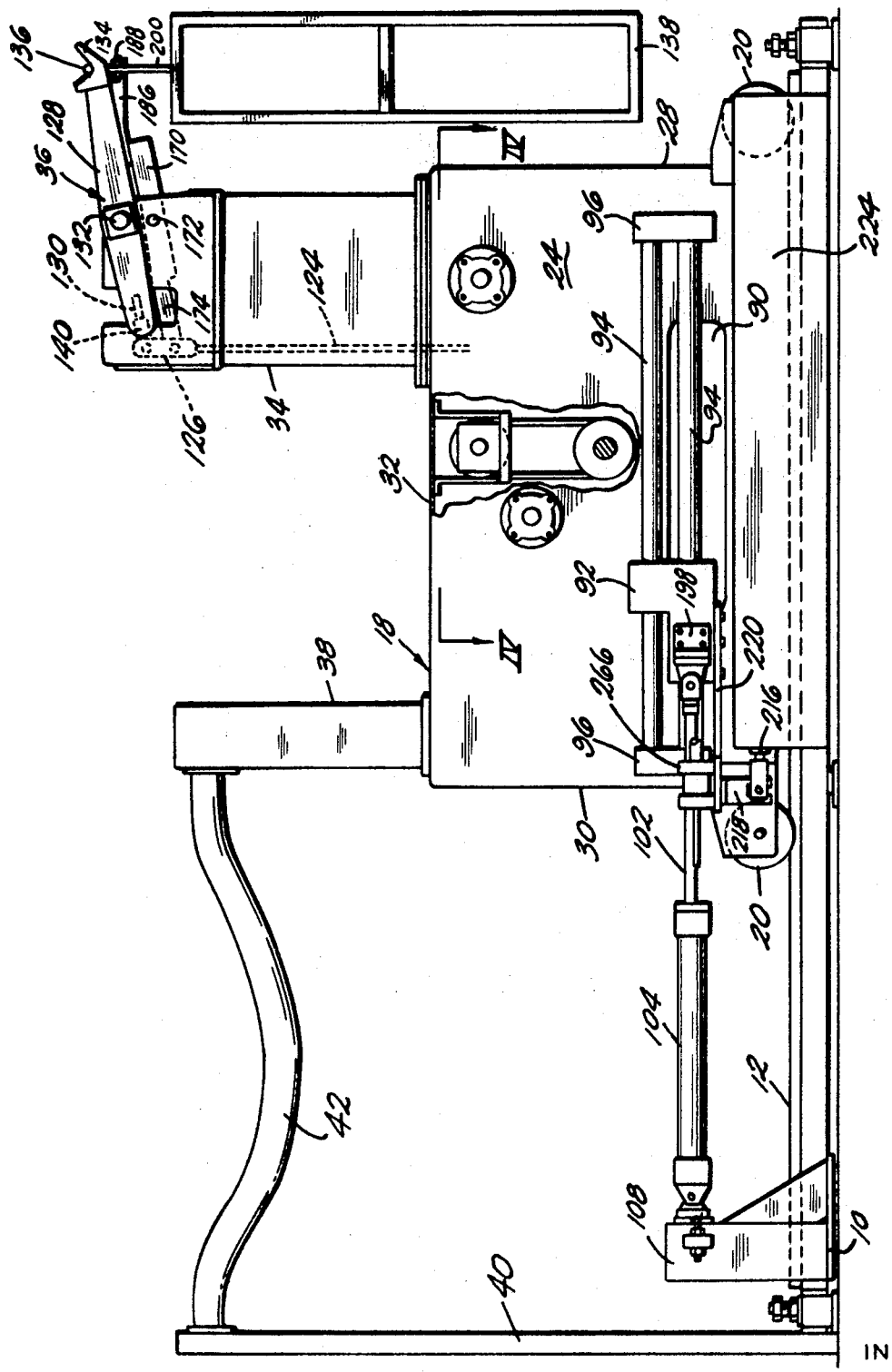
FIG. 1 is a side elevational view, with parts broken away, of the transfer device of the present invention.
Figure 2:
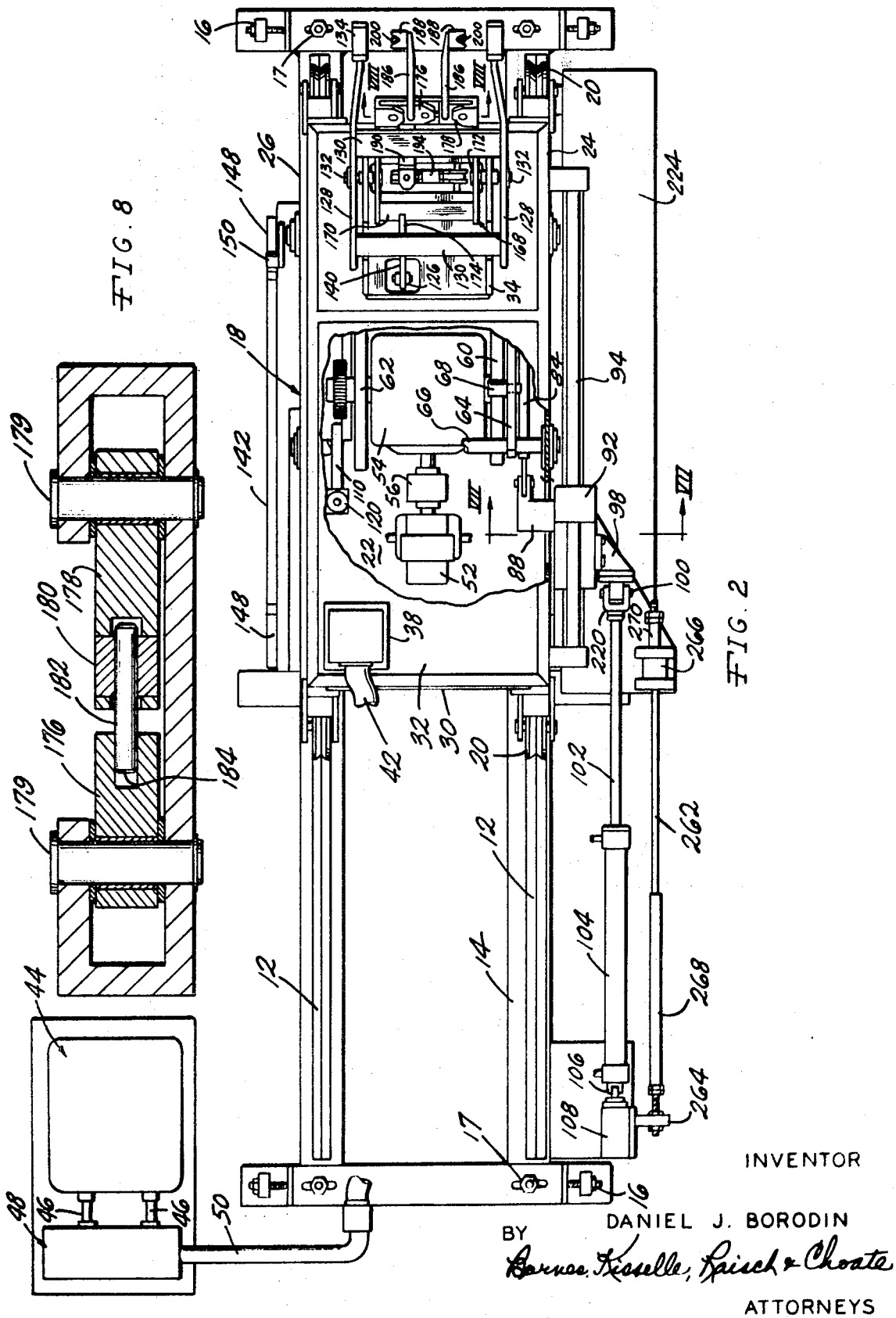
FIG. 2 is a top plan view, with parts broken away, of the transfer device illustrated in FIG. 1.
Figure 3:
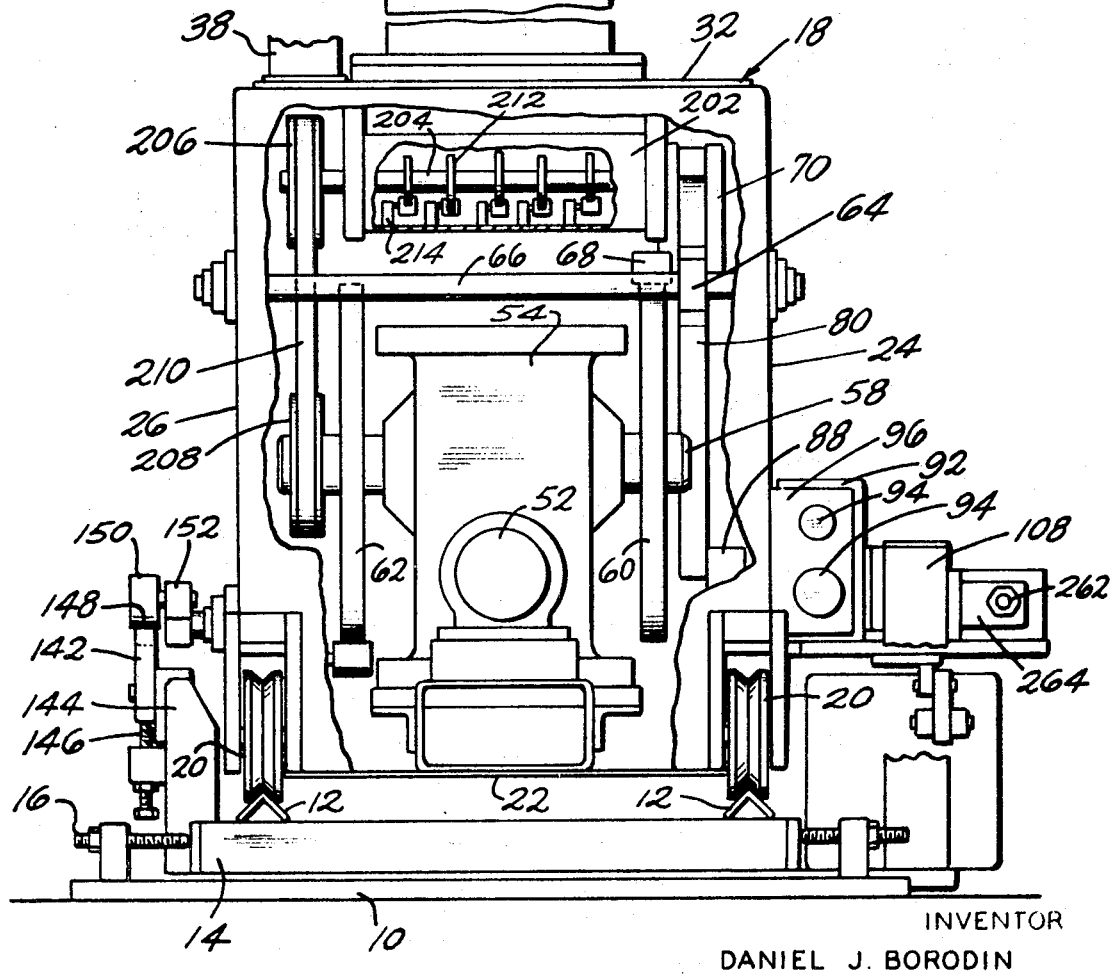
FIG. 3 is a rear elevational view, with parts broken away, of the transfer device.

Referring first to FIGS. 1 through 3, the transfer device of the present invention includes a base 10 on which is mounted a pair of rails 12 extending lengthwise of the base. Rails 12 are mounted on a base subframe 14. Frame 14 is adapted to be accurately located on base 10 by a plurality of adjusting screws 16 and clamped in place by screws 17. A carriage 18 has four guide rollers 20 mounted thereon. Guide rollers 20 ride on rails 12 and thereby restrict movement of carriage 18 to a rectilinear path. Carriage 18 comprises a housing having a bottom wall 22, opposite sidewalls 24, 26, a front wall 28 and a rear wall 30 and a top wall 32. These walls are provided with suitable access openings (not illustrated) to permit servicing of the mechanism enclosed within the carriage.

Adjacent its front end carriage 18 is provided with a hollow upstanding column 34 on which is pivoted a work support arm assembly 36. Adjacent the rear end of carriage 18 there is provided a second hollow column 38 which encloses electrical and hydraulic lines (not illustrated). The electrical and hydraulic lines extend from carriage 18 to an upright supporting post 40 on base 10 through a flexible conduit 42.

The motive power for the transfer device is illustrated in FIG. 2 and includes an electric motor-pump unit 44 connected as by hydraulic conduits 46 with an electrohydraulic control panel 48. Control panel 48 houses the necessary fluid valves, preferably solenoid operated, and the necessary electrical control components for the transfer device. The electrical and hydraulic lines within control panel 48 extend through a conduit 50 which is in turn connected with the flexible conduit 42. The individual hydraulic conduits and electrical lines extending to the various hydraulic and electrical units on the transfer device are not shown.

CURVE GENERATOR

Within carriage 18 on bottom wall 22 there is mounted a hydraulic motor 52 connected to a speed reducer 54 by a coupling 56. Speed reducer 54 has an output shaft 58 projecting outwardly at each side of the housing of reducer 54. A cam 60 is mounted on one end of shaft 58 and a cam 62 is mounted on the other end of shaft 58. Cam 60 will be referred to as the horizontal control cam and cam 62 will be referred to as the vertical control cam. Motor 52, speed reducer 54 and cams 60, 62 will be collectively referred to as the curve generator.

Figure 5:
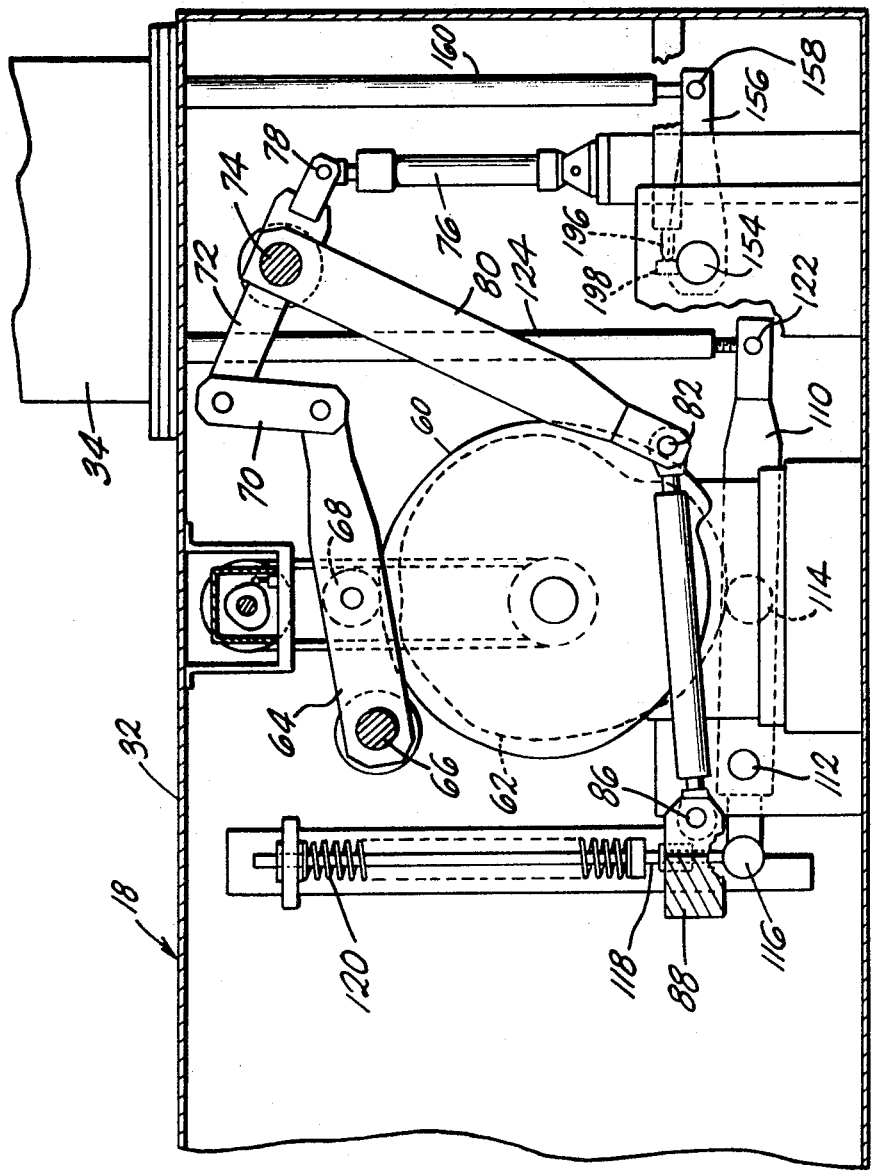
FIG. 5 is a sectional view along the line V—V in FIG. 4.

As shown in FIG. 5, a lever 64 pivotally supported by a shaft 66 has a cam follower 68 journaled thereon which engages the periphery of cam 60. The free end of lever 64 is connected by a link 70 which in turn is connected to a crank 72 pivoted on a shaft 74. Cam follower 68 is biased downwardly into engagement with the periphery of cam 60 by a hydraulic cylinder 76 which at one end is connected to crank 72 as at 78 to urge the crank in a counterclockwise direction. The lower end of arm 80 of crank 72 is pivotally connected as at 82 to one end of an adjustable link 84. The other end of link 84 is pivotally connected as at 86 to a bracket 88.

Bracket 88 extends through a horizontally extending slot 90 in sidewall 24 (FIG. 1) and is connected to a slide block 92. Block 92 is mounted on a pair of horizontally extending guide rods 94, the opposite ends of which are fixedly mounted on sidewall 24 of carriage 18 by support blocks 96. A right-angle bracket 98 secured to the outer side of slide block 92 pivotally supports (as at 100) one end of a piston rod 102 associated with a hydraulic cylinder 104. The head end of cylinder 104 is pivotally supported as at 106 on base 10 by an upright support block 108.

From the structure thus far described it will be appreciated that, if piston rod 102 is retained in a fixed position of extension and cam 60 is rotated, the displacement of cam follower 68 radially toward and away from the axis of rotation of the cam will act through the linkage shown in FIG. 5 to shift shaft 74 and thereby carriage 18 along rails 12. More specifically, if cam follower 68 shifts radially upwardly from the position shown in FIG. 5, this tends to rotate crank 80 in a clockwise direction. However, since bracket 88 to which the rear end of link 84 is connected is in a fixed position relative to base 10, clockwise rotation of crank 72 causes shaft 74 and carriage 18 to be shifted forwardly; that is, in a direction toward the right as seen in FIGS. 1, 2 and 5. Conversely, if cam follower 68 is displaced downwardly, carriage 18 is retracted or displaced toward the left as viewed in FIGS. 1, 2 and 5.

Assuming for the moment that horizontal control cam 60 is locked against rotation and hydraulic fluid under pressure is admitted to either one end or the other of cylinder 104, then piston rod 102 acting through block 92, bracket 88, link 84 and crank arm 80 displaces carriage 18 forwardly or rearwardly on base 10. It, therefore, follows that movement of carriage 18 on its forward and return stroke can be controlled as desired by properly programming the rotation of cam 60 and the actuation of cylinder 104 so that they act independently and/or simultaneously.

In FIG. 5 vertical control cam 62 is shown in broken lines. A lever 110 is pivotally supported on a stub shaft 112 mounted on and projecting inwardly from sidewall 26 of carriage 18. A cam follower 114 on lever 110 is adapted to engage the periphery of vertical control cam 62 on the lower side of the cam. One end of lever 110 is in contact as at 116 with a rod 118 biased in a downwardly direction by a compression spring 120. Thus, spring 120 urges cam follower 114 upwardly into engagement with the periphery of vertical control cam 62. The other end of lever 110 is pivotally connected as at 122 with a vertically extending rod 124. Rod 124 extends upwardly through hollow column 34 and is connected as by a link 126 with the work support arm assembly 36. Thus, as cam follower 114 is displaced vertically by cam 62 rod 124 is shifted vertically and produces a vertical rocking movement of work support arm assembly 36.

WORK SUPPORT ARM ASSEMBLY

Referring now to FIGS. 1 through 3, work support arm assembly 36 comprises a frame formed with a pair of side support arms 128 which are interconnected by cross struts 130. Arms 128 are pivotally supported on the outer sides of column 34 as at 132. The forward ends of arms 128 are provided with V-shaped fittings 134 in which the upper cross rod 136 of a workpiece, such as a plating rack 138, is adapted to be seated. The rear cross strut 130 has a rigid arm thereon 140 which is pivotally connected to link 126 at the upper end of upright rod 124. Thus, as rod 124 is shifted vertically, fittings 134 are reciprocated vertically in an arcuate path.

Referring now to FIGS. 2 through 5, a cam bar 142 is fixedly mounted on subframe 14 by support blocks 144 and adjusting screws 146. Cam bar 142 extends horizontally of base 14 parallel to the path of travel of the carriage. Cam bar 142 is fashioned with raised cam surfaces 148 adjacent opposite ends thereof. A cam follower 150 is mounted on sidewall 26 of carriage 18 by a crank 152 on a shaft 154. Within carriage 18 there is fixedly mounted on shaft 154 a crank arm 156 which is pivotally connected as at 158 with the lower end of a vertically extending rod 160. Rod 160 extends upwardly through column 34 and at its upper end is connected as at 162 to one arm of a bellcrank 164. Crank 164 is supported on column 34 as at 166 for pivotal movement in a vertical plane.

Support arm assembly 36 includes a clamp subassembly 168 which is adapted to be actuated by rocking movement of bellcrank 164. Clamp subassembly 168 comprises an open rectangular frame 170 which is pivotally supported within column 34 at each side thereof as at 172. The rear portion of frame 170 is connected with link 126 at the upper end of upright rod 124 by a bar 174. At the front portion of frame 170 a pair of short levers 176 and 178 are pivotally supported thereon as by pins 179 (FIG. 8). A bushing 180 rotatably mounted in lever 178 carries a pin 182 which projects into an opening 184 in the confronting end of lever 176. In this manner levers 176, 178 are interconnected for pivotal movement in unison about their respective pivot pins 179. Levers 176, 178 each carry a forwardly projecting clamp arm 186 provided with a V-shaped lug 188 at the forward end thereof. Lever 176 is also provided with a crank arm 190 (FIGS. 2 and 3) connected to bellcrank 164 as at 192 by an adjustable link 194. Link 194 is axially aligned with the pivot axis 172 of frame 170.

Figure 4:
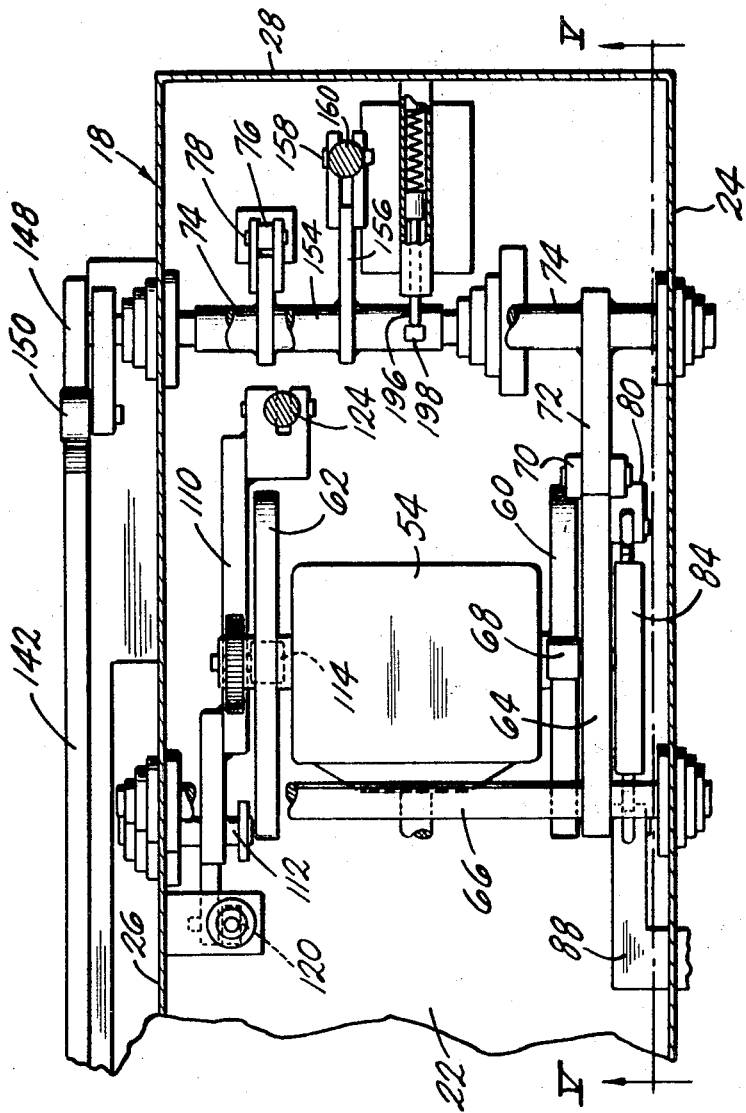
FIG. 4 is a sectional view generally along the line IV—IV in FIG. 1.

In operation, when carriage 18 approaches the opposite ends of its stroke, cam follower 150 is elevated by the raised cam surfaces 148 on cam bar 142 to rock crank 156 (FIG. 5) in a clockwise direction. Cam follower 150 is normally urged downwardly into engagement with cam bar 142 by a spring pressed plunger 196 which bears against a radial lug 198 on shaft 154 (FIGS. 4 and 5). When crank 156 rocks downwardly in a clockwise direction upright rod 160 shifts vertically downwardly thereby rocking bellcrank 164 (FIG. 3) in a counterclockwise direction. This causes the two clamp arms 186 to pivot inwardly toward each other from the position shown in FIG. 2 wherein they are in clamping relation with the two upright support rods 200 by means of which the upper cross rod 136 is connected to the plating rack 138. Thus, as carriage 18 approaches the opposite ends of its stroke, cam follower 150 rides upwardly onto raised cam surfaces 148 and clamp arms 186 are retracted toward one another out of engagement with the upright rods 200 on the plating rack.

As shown in FIG. 1, the distance between the pivot axis 132 of support arms 128 and their connection with link 126 is the same as the distance between the pivot axis 172 of frame 170 and its connection with link 126. Likewise the distance between the V-shaped fittings 134 and the pivot axis 132 is the same as the distance between the V-shaped lugs 188 and the pivot axis 172. Accordingly, support arms 128 and clamp arms 186 are interconnected by a parallelogram linkage so that in response to actuation of rod 124 fittings 134 and lugs 188 are caused to move in unison and the plating rack 138 is maintained in a stable, generally vertical position. Furthermore, since link 194 which interconnects bellcrank 164 with arm 190 on the clamp assembly is axially aligned with pivot axis 172, the clamping action of arms 186 is unaffected by their rocking movement in a vertical plane.

ROTARY LIMIT SWITCH ASSEMBLY

Referring now to FIG. 3, there is mounted within carriage 18 a housing 202 in which a shaft 204 is journaled. A timing gear pulley 206 on one end of shaft 204 is connected with a timing gear pulley 208 on shaft 58 by a timing belt 210. Thus, shaft 204 is arranged to be rotated in perfect synchronism with shaft 58. A plurality of rotary cams 212 fixed on shaft 204 are adapted to actuate limit switches 214 in housing 202. Limit switches 214 will be hereinafter referred to as rotary limit switches. With this arrangement the actuation of each rotary limit switch 214 can be accurately timed in relation to the rotative position of the horizontal and vertical control cams 60, 62.

LINEAR LIMIT SWITCH ASSEMBLY

Referring now to FIGS. 1, 2, 6 and 7, a linear switch assembly is disclosed. The linear limit switch assembly generally comprises a tubular control rod 216 (FIG. 6) connected at one end with a bracket 218 which depends from a plate 220 secured to the bottom face of slide block 92. At its other end control rod 216 is telescopically engaged over a guide rod 222 fixedly mounted on the end wall of housing 224 in which the linear switch assembly is enclosed. Thus, control rod 216 is constrained to move longitudinally with slide block 92. A threaded rod 226 is rigidly mounted on control rod 216 by a series of clamps 228 spaced apart along control rod 216. Each clamp 228 has a depending portion which serves as a switch or valve actuating member. Thus, as shown in FIG. 6, clamp 228 at the right end of rod 216 has a lug 230 thereon which, when slide block 92 is at the forward end of its stroke, is adapted to actuate the rocking arm 232 of limit switch LS1. The next adjacent clamp on control rod 216 to the left of lug 230 in FIG. 6 has a cam lug 234 which, when slide block 92 is moving forward, is adapted to actuate the rocking arm 236 of limit switch LS2. The two center clamps shown in FIG. 6 carry oppositely arranged linear cams 238 and 240. When slide block 92 approaches the forward end of its stroke cam 240 is adapted to progressively rotate a rocking lever 242 and when slide block 92 approaches the end of its return stroke; that is, towards the left as viewed in FIG. 6, the oppositely disposed cam 238 is adapted to progressively rotate rocking lever 244. Rocking levers 242, 244 are interconnected with a control rod 246 having an arm 248 thereon which engages the spool 250 of a deceleration valve 252. Valve 252 controls the rate of fluid flow to cylinder 104 which in turn actuates slide block 92. Clamp 228 at the left end of threaded rod 226 has a lug 254 which, when slide block 92 approaches the end of its return stroke, is adapted to actuate the rocking arm 256 of limit switch LS4. The second clamp 228 from the left end of threaded rod 226 has a cam lug 258 on the underside thereof which at a predetermined point on the return stroke of slide block 92 is adapted to actuate the rocking arm 260 of limit switch LS3.

It will be appreciated that each of the clamps 228 can be accurately located along control rod 216 so that the switches and valves described can be actuated at precisely the desired point of travel of slide block 92 along guide bars 94.

SLIDE STROKE LIMIT ASSEMBLY

Referring now to FIG. 2 the means for limiting the stroke of slide block 92 comprises a rod 262 which is secured at one end to a fixed arm 264 extending laterally outwardly on upright support block 108. A rubber bumper block 266 is mounted on plate 220 carried by slide block 92. Rod 262 extends through bumper block 266. Two sleeves 268 and 270 are telescopically arranged over the opposite ends of rod 262 and are adapted to be accurately adjusted longitudinally thereof. The confronting ends of sleeves 268, 270 form shoulders against which the opposite end faces of bumper block 266 are adapted to abut as slide block 92 reaches the opposite ends of its stroke.

OPERATION

Any desired trajectory or path of travel can be generated for the V-shaped fittings 134 at the outer ends of work support arms 128 by the proper programming of the various switches and valves. In FIGS. 9 and 10 one illustrative trajectory of fittings 134 is illustrated in the particular arrangement illustrated it is assumed that the transfer device is arranged to advance from a retracted, out-of-the-way position to pick up a rack 138 from a conveyor hook at location A, transport the rack laterally and deposit it on a conveyor hook at location B and also to pick up a rack from the conveyor hook at location B and return it to the conveyor hook at location A. It will be observed that in transporting the rack from the conveyor at position A to the conveyor at position B, fittings 134 on arms 128 are programmed to first lift the rack vertically to clear the conveyor hook at position A, then transport the rack horizontally while it is being lowered to clear overhead obstructions (not shown), then as the rack being transported approaches the conveyor at position B, the rack is again raised and lowered to deposit it downwardly on the conveyor hook at position B. Thereafter the V-shaped fittings 134 are further lowered and retracted a short distance to a position out of the way of the conveyor at position B. This typical path of travel may be generated by the proper design of horizontal control cam 60 and vertical control cam 62 as well as the proper programming of the various rotary and linear switches described.

It is assumed that in the fully retracted position of carriage 18 fittings 134 on the ends of support arms 128 are located at the position shown at $a$ in FIGS. 9 and 10; that is, to the left of the conveyor at position A. In this position of the carriage horizontal control cam 60 assumes a rotative position wherein cam follower 68 is located at point $a$ on the periphery of the cam. Referring to FIG. 10, when a start button (not shown) is actuated fluid under pressure is directed to hydraulic motor 52 to start rotating both cams of the curve generator. In the forward stroke of the carriage cam 60 rotates in the counterclockwise direction shown in FIG. 12. When cam 60 rotates in this direction cam follower 68 at point $a$ on the periphery of the cam is displaced in a radially outward direction so as to advance the carriage in its forward stroke. During the initial rotation of the cams cam follower 114 is engaged with a peripheral portion of the vertical control 62 which is generated by a constant radius of curvature. Thus, at the start of the forward stroke of carriage 18 V-shaped fittings 134 traverse a generally horizontal path. The required peripheral contour of vertical control cam 62 in order to produce the vertical component of the trajectory illustrated in FIGS. 9 and 10 is readily arrived at and need not be described. The shape of the cam required to produce this trajectory is generally illustrated in FIG. 5.

When the fittings 134 reach the position designated $b$ in FIG. 10 the proper rotary switch 214 in housing 202 is actuated to direct fluid to the head end of cylinder 104 and thus initiate the forward stroke of slide block 92. Then between points $b$ and $c$ in the trajectory shown in FIG. 10 carriage 18 is travelling forwardly by reason of the combined displacements of cam follower 68 and slide block 92. At point $c$ another rotary switch 214 in housing 202 actuates a solenoid for cutting off the supply of fluid to hydraulic motor 52. Thus operation of the curve generator is terminated and cams 60, 62 stop rotating with cam follower 68 at point $c$ on the periphery of cam 60. At this point the carriage continues on its forward stroke solely by reason of the continued operation of hydraulic cylinder 104.

Both cams 60, 62 remain stationary until cam lug 234 in the linear switch assembly illustrated in FIG. 6 engages the rocking arm of limit switch LS2. When switch LS2 is actuated it operates a solenoid valve which directs pressure fluid to hydraulic motor 52 and thus restarts the curve generator. As slide block 92 approaches the end of its forward stroke cam plate 240 actuates valve lever 242 and thus shifts spool 250 of decelerating valve 252 in a direction to reduce the rate of fluid flow to cylinder 104. The rate at which slide block 92 approaches the end of its stroke is thus decreased. Eventually lug 230 on control rod 216 actuates arm 232 of limit switch LS1 which in turn actuates the solenoid valve to shut off the flow of fluid to hydraulic cylinder 104 and thus arrest the forward movement of slide block 92.

However the curve generator is still operating and the shape of cams 60, 62 is such as to impart to fittings 134 the trajectory extending from the point designated LS1 to $e$ in FIG. 10. In other words, the periphery of cam 60 between points $c$ and $e$ is designed to displace cam follower 68 initially upwardly until the rack being transported is deposited on the conveyor hook at position B and then downwardly to retract work support arm 128 to an out-of-the-way position at point $e$.

In the normal arrangement after the rack is deposited on the conveyor hook at position B the conveyor is indexed to present another rack at position B. At this time cam follower 68 is engaging the periphery of cam 60 at point $e$. When a new rack is located at position B and the conveyor is stopped, a suitable switch is actuated either manually or automatically to start operation of the curve generator in the opposite direction and to initiate the return stroke of the carriage. Thus cam 60 now rotates in the clockwise direction illustrated in FIG. 11. The two cams 60 and 62 rotate simultaneously to generate the loop illustrated at the right end of the trajectory illustrated in FIG. 9. This causes the V-shaped fittings 134 to engage the new rack and lift it off the conveyor at position B.

When cam 60 has rotated to a position wherein cam follower 68 is traversing the position $d$ on the periphery of cam 60 (FIG. 11), one of the rotary switches 214 in housing 202 actuates the solenoid valve which directs pressure fluid to the rod end of hydraulic cylinder 104. This causes slide block 92 to initiate its return stroke. Thus between points $d$ and $c$ in FIG. 9 the carriage return movement results from the combined action of cam 60 and cylinder 104.

At point c on the periphery of cam 60 one of the rotary limit switches 214 in housing 202 actuates the solenoid valve to stop the flow of pressure fluid to motor 52 and thus stops operation of the curve generator. Thereafter carriage 18 retracts solely under the influence of hydraulic cylinder 104 until such time as cam lug 258 on control rod 216 engages arm 260 of limit switch LS3. When limit switch LS3 is actuated it energizes the solenoid valve controlling the flow of fluid to motor 50 to restart the curve generator. Cam follower 68 thus begins to traverse the periphery of cam 60 between points c and a. As slide block 92 approaches the end of its return stroke cam plate 238 on control rod 216 engages lever 244 which controls valve 252 to gradually reduce the rate of travel of slide block 92. When slide block 92 reaches the end of its retraction stroke, lug 254 on control rod 216 actuates arm 256 of limit switch LS4. When limit switch LS4 is tripped it actuates the solenoid valve directing fluid to the rod of cylinder 104 and thus terminates the retraction stroke of slide block 92. The curve generator continues to operate and the peripheries of cams 60 and 62 are shaped such that the V-shaped fittings 134 deposit the rack on the conveyor hook located at position A and then retracts to an out-of-the-way position illustrated at the extreme left of FIG. 9. At this position of the carriage cam follower 68 is traversing point a on cam 60 and one of the rotary limit switches 214 in housing 202 is tripped to actuate the solenoid valve directing fluid to motor 52 to shut off the flow of pressure fluid to the motor and thus stop the curve generator.

In the above-described arrangement it will be appreciated that by supplementing the horizontal translatory movement of carriage 18 as produced by cam 60 by the action of hydraulic cylinder 104, the effective radius of cam 60 is substantially reduced. It will also be appreciated that by varying the shapes of cams 60,62 and by the proper rotative adjustment of rotary switches 214 and the linear adjustment of the limit switches in housing 224 any desired trajectory or path of travel for the fittings 134 at the ends of work support arms 128 can be generated. In addition, by changing the rate of rise along the peripheries of the horizontal and vertical control cams 60,62 the instantaneous velocity of V-shaped fittings 134 along a given trajectory can also be controlled at every point of the trajectory.

I claim:

1. A device for bodily transporting a workpiece between two spaced apart locations comprising a support, a carriage mounted on said support for reciprocation in a path extending generally between said two locations, a work support member mounted on said carriage for movement in a direction generally transversely of the path of travel of the carriage, drive means mounted on said carriage for bodily movement therewith, a pair of cams mounted on the carriage for bodily movement therewith, said cams being adapted to be driven by said drive means, a first cam follower engaging a first one of said cams, a second cam follower engaging the second cam, a reaction member mounted on said support, mechanical linkage means operatively connecting the first cam follower and said reaction member such that displacement of the first cam follower in opposite directions by reason of the rise and fall in the cam surface of the first cam produces a proportional displacement of said carriage in opposite directions along said path of reciprocation on said support and mechanical linkage means operatively connecting the second cam follower with said work support member such that displacement of the second cam follower in opposite directions by reason of the rise and fall of the cam surface of the second cam produces a proportional displacement of said work support member in opposite directions in said transverse path whereby simultaneous displacement of said first and second cam followers in response to actuation of both cams causes said work support member to travel in a path extending between said two locations which is curved in said transverse direction.

2. A transfer device as called for in claim 1, wherein said reaction member is mounted on said carriage support for reciprocation in a path parallel to the path of reciprocation of the carriage on said support and means for reciprocating said reaction member to reciprocate the carriage on said support independently of the displacement of the first cam follower.

3. A transfer device as called for in claim 1, wherein said drive means comprises a motor adapted to drive both cams in opposite directions.

4. A transfer device as called for in claim 3, including means for programming the starting, stopping and reversal of said cams in a predetermined sequence for causing said work support member to follow a predetermined path of travel between said two locations.

5. A transfer device as called for in claim 4, including a work support arm pivotally mounted on said carriage, said work support member comprising a portion of said support arm spaced from its pivotal connection with the carriage.

6. A transfer device as called for in claim 5, wherein the carriage is mounted for reciprocation in a generally horizontal plane and said arm is mounted for movement in a generally vertical plane.

7. A transfer device as called for in claim 4, wherein said cams are mounted for rotation on said carriage.

8. A transfer device as called for in claim 4, wherein both cams are connected with said motor for operation in unison therewith.

9. A transfer device as called for in claim 4, wherein said drive means includes a motor-driven rotary shaft, both of said cams being operatively connected with said rotary shaft.

10. A transfer device as called for in claim 9, wherein said programming means includes rotary switch means driven by said shaft in unison therewith.

11. A transfer device as called for in claim 4, wherein said cam driving means comprises a motor-driven rotary shaft, both of said cams being mounted on said shaft for rotation therewith.

12. A transfer device as called for in claim 1, including a clamp mechanism associated with said work support member for releasably clamping the workpiece to the work support member and means for actuating said clamp mechanism adjacent opposite ends of the stroke of the carriage.

13. A transfer device as called for in claim 12, wherein said actuating means comprises a pair of cams on said carriage support, a cam follower movably mounted on the carriage, said last-mentioned cams being adapted to displace said last-mentioned cam follower adjacent opposite ends of the stroke of the carriage and means operatively connecting the last-mentioned cam follower with the clamp mechanism.

14. A device for bodily transporting a workpiece between two spaced apart locations comprising a support, a carriage mounted on said support for reciprocation in a path extending generally between said two locations, a work support arm pivotally mounted on said carriage for movement in a direction generally transversely of the path of travel of the carriage, said work support arm having a work support member thereon spaced from the pivotal connection between the support arm and the carriage, drive means comprising a motor on said carriage, a pair of cams on said carriage adapted to be driven in opposite directions by said drive means, a first cam follower engaging a first one of said cams, a second cam follower engaging the second cam, means operatively connecting the first cam follower and said carriage support such that displacement of the first cam follower by the first cam produces a proportional displacement of said carriage along said path of reciprocation, means operatively connecting the second cam follower with said work support member such that displacement of the second cam follower by said second cam produces a proportional displacement of said work support member in said transverse path whereby simultaneous displacement of said first and second cam followers in response to actuation of both cams causes said work support member to travel in a path extending between said two locations which is curved in said transverse direction, means for programming the starting, stopping and reversal of said cams in a predetermined sequence for causing said work support member to follow a predetermined path of travel between said two locations, and a second arm pivotally supported on said carriage, means forming a parallelogram linkage between said arms so that the arms move in unison, a clamp mechanism carried by said second arm for releasably clamping a workpiece to the work support member and means for actuating the clamp mechanism adjacent opposite ends of the stroke of the carriage.

15. A transfer device as called for in claim 14, wherein said clamp mechanism includes a clamping lever mounted on said second arm for pivotal movement about an axis spaced from and generally perpendicular to the pivotal axis of the second arm, an actuating member pivotally connected with said clamp lever at the pivotal axis of the second arm and adapted when actuated to shift the pivotal connection between the actuating member and the clamp lever substantially along the pivotal axis of the second arm.

16. A transfer device as called for in claim 15, wherein said actuating member is pivotally supported on said carriage.

17. A transfer device as called for in claim 16, wherein said means for actuating said clamp mechanism comprises a pair of cams on said support, a cam follower mounted on said carriage and adapted to be displaced by said last-mentioned cams when the carriage is adjacent opposite ends of its stroke and means operatively connecting said last-mentioned cam follower with said actuating member.

18. A device for bodily transporting a workpiece between two spaced apart locations comprising a support, a carriage mounted on said support for reciprocation in a path extending generally between said two locations, a work support member mounted on said carriage for movement in a direction generally transversely of the path of travel of the carriage, drive means comprising a motor on said carriage, a pair of cams on said carriage adapted to be driven in opposite directions by said drive means, a first cam follower engaging a first one of said cams, a second cam follower engaging the second cam, means operatively connecting the first cam follower and said carriage support such that displacement of the first cam follower by the first cam produces a proportional displacement of said carriage along said path of reciprocation and means operatively connecting the second cam follower with said work support member such that displacement of the second cam follower by said second cam produces a proportional displacement of said work support member in said transverse path whereby simultaneous displacement of said first and second cam followers in response to actuation of both cams causes said work support member to travel in a path extending between said two locations which is curved in said transverse direction, means for programming the starting, stopping and reversal of said cams in a predetermined sequence for causing said work support member to follow a predetermined path of travel between said two locations, said means operatively connecting the first cam follower with said support including an extensible drive unit connected at one end with said support and operatively connected at its opposite end with said first cam follower and means for extending and contracting said extensible drive unit for displacing said opposite end thereof in a path parallel to the path of travel of the carriage and thereby reciprocate said carriage independently of the displacement of said first cam follower.

19. A transfer device as called for in claim 18, including means for programming the operation of said means for operating the extensible drive unit.

20. A transfer device as called for in claim 18, wherein the operative connection between the first cam follower and the extensible drive unit includes a drive linkage between the first cam follower and said opposite end of said extensible drive unit whereby when said first cam follower is displaced by the first cam said drive linkage displaces the carriage relatively to said one end of the extensible drive unit.

21. A transfer device as called for in claim 20 wherein said drive linkage includes a lever supported on said carriage for pivotal movement about a fixed axis, said lever having one portion thereof connected with said cam follower and another portion thereof connected with said opposite end of the extensible drive unit.

22. A transfer device as called for in claim 18, wherein said means for programming the operation of said cams comprises switch means and switch actuating means, one of the last two mentioned means being mounted to move with said opposite end of said extensible drive unit and the other of the last two mentioned means being mounted on said support.

23. A transfer device as called for in claim 22, wherein said means for programming the operation of said cams also includes switch means on said carriage and means driven in synchronization with said cams for actuating the last-mentioned switch means, said first switch means being adapted to start operation of said cams and said last switch means being adapted to stop operation of said cams.

24. A transfer device as called for in claim 19, wherein said means for programming the operation of said cams and said extensible drive unit comprise a first series of switches on the carriage, a series of detents for tripping the switches in said first series, said detents being rotatably supported on the carriage and driven in synchronization with said cams, a second series of switches on said support and a series of detents for tripping the switches in said second series, said last-mentioned detents being mounted for movement with said opposite end of the extensible drive unit.

25. A transfer device as called for in claim 24, wherein said extensible drive unit comprises a hydraulic piston-cylinder assembly and means for supplying fluid under pressure to said cylinder.

26. A transfer device as called for in claim 25, including a valve means for varying the rate of flow of pressure fluid to said piston-cylinder assembly to thereby vary the rate at which the carriage is displaced by the piston-cylinder assembly, means on said support for actuating said valve and means movable with the movable component of the piston-cylinder assembly and engageable with said valve actuating means for actuating the same at predetermined positions of the carriage.

27. A transfer device as called for in claim 25, including valve means for varying the rate of flow of pressure fluid to said piston-cylinder assembly to thereby vary the rate at which the carriage is displaced by the piston-cylinder assembly, means on said support for actuating said valve means and cam means mounted for movement with the movable component of the piston-cylinder assembly and engageable with the valve actuating means for varying the speed of the carriage at predetermined positions along its stroke.

* * * * *